United States Patent
Kuroda et al.

(10) Patent No.: US 7,020,062 B2
(45) Date of Patent: Mar. 28, 2006

(54) INFORMATION RECORDING MEDIUM WITH A TRACK CARRYING A RANDOMIZED WOBBLE SIGNAL, AND APPARATUS FOR READING SUCH

(75) Inventors: Kazuo Kuroda, Tokorozawa (JP); Shoji Taniguchi, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 88 days.

(21) Appl. No.: 10/136,445

(22) Filed: May 2, 2002

(65) Prior Publication Data

US 2002/0172119 A1 Nov. 21, 2002

(30) Foreign Application Priority Data

May 2, 2001 (JP) .......................... P2001-134948

(51) Int. Cl.
*G11B 7/00* (2006.01)

(52) U.S. Cl. .................. 369/53.34; 369/53.3; 713/189; 380/203

(58) Field of Classification Search ............. 369/53.34, 369/53.3; 360/46; 713/189, 200; 380/203, 380/210
See application file for complete search history.

(56) References Cited

U.S. PATENT DOCUMENTS

| | | | |
|---|---|---|---|
| 5,724,327 A | | 3/1998 | Timmermans et al. ......... 369/48 |
| 5,737,286 A | * | 4/1998 | Timmermans et al. ... 369/44.13 |
| 5,917,910 A | * | 6/1999 | Ishiguro et al. ............... 705/57 |
| 5,933,410 A | * | 8/1999 | Nakane et al. ........... 369/275.3 |
| 6,191,902 B1 | * | 2/2001 | Hashimura et al. ........... 360/46 |
| 6,476,992 B1 | * | 11/2002 | Shimatani ..................... 360/46 |
| 6,628,583 B1 | * | 9/2003 | Van Den Enden et al. 369/47.1 |
| 6,636,689 B1 | * | 10/2003 | Stebbings ..................... 386/94 |
| 6,671,238 B1 | * | 12/2003 | Ko et al. .................. 369/47.1 |
| 6,694,023 B1 | * | 2/2004 | Kim ........................... 380/203 |

FOREIGN PATENT DOCUMENTS

| | | |
|---|---|---|
| JP | 2001-216650 | 8/2001 |
| WO | WO 96/27191 | 9/1996 |
| WO | WO 00/45381 | 8/2000 |

* cited by examiner

*Primary Examiner*—Gautam R. Patel
(74) *Attorney, Agent, or Firm*—Drinker Biddle & Reath LLP

(57) ABSTRACT

An information recording medium is provided with a wobbled track, wherein at least a part of the track is subjected to wobbling based on a wobble signal in which at least a part of recording information is randomized. Each track is wobbled at a randomized frequency, so that a frequency of a wobbling signal obtained from the wobbled track is randomized. As a result, the influence of crosstalk between adjacent track is reduced.

4 Claims, 7 Drawing Sheets

INFORMATION RECORDING MEDIUM WITH A TRACK CARRYING A RANDOMIZED WOBBLE SIGNAL, AND APPARATUS FOR READING SUCH

BACKGROUND OF THE INVENTION

1. Field of the Invention

The present invention relates to an information recording medium having a track, which is subjected to wobbling, and an information reading apparatus for reading information of the track.

2. Description of the Related Art

Currently, an optical disk typified by a CD and a DVD has been put into practice. In addition to a CD-DA (CD-Digital Audio) and so on, which is a recording medium only for reproducing, in recent years, CD-R (CD-Recordable) for one-time recording digital data and CD-RW (CD-ReWritable) for rewriting digital data for two or more times and so on also have been put into practice.

In recording and reproduction of an optical disk, the optical disk needs to be rotated at a predetermined speed. In the case of a recording medium only for play, a predetermined rotation speed can be obtained by synchronizing a rotation speed to a reproducing frequency of digital data during reproduction. Meanwhile, in the case of a recordable recording medium such as CD-R and CD-RW, in an initial state, digital data is not recorded in a track, so that the same method cannot be used for controlling a rotation speed. Thus, in a recordable recording medium, a track (groove track) is subjected to wobbling according to a wobble signal obtained by performing FM modulation on a wobble reference signal, which has a predetermined fundamental frequency, based on address information, a rotation speed of the optical disk is controlled in response to the wobble reference signal extracted from a wobble signal read from the track, and the address of the track is identified by demodulating the wobble signal.

However, crosstalk and so on enters a wobble signal. The crosstalk is caused by wobble from an adjacent track or by a recording mark formed on a track which is subjected to wobbling a wobble signal. Hence, the wobble signal has a degraded CN (Carrier to Noise ratio), a problem occurs on reading of address information recorded by FM modulation and so on, and the reference signal extracted from the wobble signal becomes inaccurate. Further, in the case of a multilayer disk as well, the same problem results from crosstalk of a wobble signal between layers. Hence, it is difficult to accurately perform writing in the multilayer disk.

For example, when a track pitch is smaller, a beam extends substantially to an adjacent groove and is affected by a phase of wobble of the adjacent track. Besides, since a phase changes complicatedly between adjacent grooves, a value of a reading signal based on reflected light of the beam is largely changed by the influence of the adjacent track.

As described above, in the conventional method, when the track is affected by noise and crosstalk, it is difficult to detect a signal with accuracy.

SUMMARY OF THE INVENTION

The present invention has as its object the provision of an information recording medium, which can eliminate the influence of noise such as crosstalk to a wobble signal, and an information reader for reading information from the information recording medium.

The information recording medium of the present invention is characterized in that at least a part of a track is subjected to wobbling based on a wobble signal in which at least a part of recording information is randomized.

According to the above information recording medium, since at least a part of a track is subjected to wobbling based on a wobble signal in which at least a part of recording information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like on a wobble signal.

A wobbling signal may be a signal in which at least a part of recording information is randomized by using a randomizing pattern.

In this case, the influence of noise such as crosstalk can be effectively eliminated by using a plurality of randomizing patterns and frequently switching the randomizing patterns. When the randomizing patterns on adjacent tracks are different from each other, it will be more effective.

A wobble signal may be a signal in which at least a part of recording information is randomized by changing in a short period a fundamental frequency of a signal used for spread spectrum.

In this case, the influence of noise such as crosstalk can be eliminated more effectively by switching reference frequencies such that adjacent tracks are different in fundamental frequency of a signal used for spread spectrum.

A track may have a part wobbled by recording information not being randomized.

In this case, based on a part of the track that is not randomized, necessary information such as information indicating a synchronizing signal and a track can be quickly and readily obtained without using a complicated circuit and so on.

A track may have different wobbling amplitudes between a part corresponding to the randomized recording information and the other part corresponding to recording information not being randomized.

In this case, the information of the part can be positively read by increasing a wobbling amplitude on a part to be suppressed in influence of crosstalk and noise from other tracks.

A wobbling amplitude of the other part corresponding to the recording information not being randomized may be larger than that of the part corresponding to the randomized recording information.

In this case, information such as a synchronizing signal that is recorded in the part not being randomized can be positively obtained without using a complicated circuit and so on.

A randomized recording information may include a randomized specific synchronizing signal.

In this case, a randomized specific synchronizing signal is read and compared with a specific synchronizing signal, so that it is possible to detect a method of randomizing, such as a randomizing pattern.

A randomized recording information may further include substantial data that is randomized with the same randomizing pattern as that of the randomized specific synchronizing signal.

In this case, since it is possible to detect a method of randomizing such as a randomizing pattern by comparing the randomized specific synchronizing signal with the specific synchronizing signal, the randomized recording information can be restored by using the same randomizing pattern.

A randomized recording information includes a randomized synchronizing signal and substantial data that is randomized with a randomizing pattern indicated by the randomized synchronizing signal.

In this case, since it is possible to determined a randomizing pattern indicated by the randomized synchronizing signal, the substantial data can be restored.

A randomizing pattern may be different between adjacent tracks.

In this case, when information is restored, since crosstalk components from an adjacent track are largely suppressed, the influence between adjacent tracks can be reduced more effectively.

A wobble signal may have different fundamental frequencies between adjacent tracks.

In this case, when information is restored, since crosstalk components from an adjacent track are largely suppressed, the influence between adjacent tracks can be reduced more effectively.

The same randomizing pattern may be used in a region serving as a unit of processing the recording information.

In this case, since the same randomizing pattern is used for each unit, it is not necessary to switch a changing method for each unit when information recorded in a track is restored.

A fundamental frequency is randomized by the same signal in a region serving as a unit of processing the recording information.

In this case, since an equal fundamental frequency may be used for each unit, it is not necessary to switch a fundamental frequency in each unit when information recorded in a track is restored. The unit may be an ECC block.

In this case, the same randomizing pattern or an equal fundamental frequency is used in each ECC block. Thus, it is not necessary to switch a changing method or a fundamental frequency in each ECC block when information recorded in a track is restored.

The unit may be equal to a data error correction unit of a recording mark.

In this case, the same randomizing pattern or an equal fundamental frequency is used in each data error correction unit. Thus, it is not necessary to switch a changing method or a fundamental frequency in each unit when information recorded in a track is restored.

Two or more kinds of randomizing patterns may be used with different occupied bands, and randomizing patterns with different occupied bands may be used between adjacent tracks.

In this case, occupied bands of used randomizing patterns are different between adjacent tracks. Hence, the influence between adjacent tracks can be suppressed more effectively.

The randomized recording information may include a synchronizing signal and substantial data.

In the information reading apparatus of the present invention, a track is wobbled based on a wobble signal including randomized information and a track marker that is not randomized, and the information reading apparatus is provided with: a reading device for reading a wobble signal based on wobbling of the track; a detecting device for detecting a track marker signal included in the wobble signal; and a linear velocity measuring device for measuring a linear velocity of the information recording medium based on the detected track marker signal.

According to the above information reading apparatus, since the track is wobbled based on a wobble signal including randomized information and a track marker that is not randomized, and a reading linear velocity is measured based on a track marker signal that is included in the wobble signal and detected, a correct linear speed can be computed based on a waveform of a marker deformed by the influence of crosstalk and noise.

An information reproducing device is provided for reproducing information of the information recording medium. The reproducing device may be provided with a signal processing device for performing signal processing using a clock according to a linear velocity measured by the linear velocity measuring device.

In this case, the information reproducing device can perform signal processing using an accurate clock based on a correct linear velocity.

An information recording device is provided for recording information in the information recording medium. The recording device may be provided with a signal processing device for performing signal processing using a clock based on a linear velocity measured by the linear velocity measuring device.

In this case, the information recording device can perform signal processing using an accurate clock based on a correct linear velocity.

A randomized information may be randomized by using any one of a plurality of randomizing patterns, and information reading apparatus may further be provided with: a randomizing signal output device for outputting a plurality of randomizing signals by using a plurality of randomizing patterns; and a comparing device for comparing a plurality of signals outputted from the randomizing signal output device and a wobble signal read by the reading device. The comparing device may determine a randomizing pattern used for randomizing of the randomized information based on the compared result.

In this case, since a randomizing pattern is positively determined by comparing a plurality of randomizing signals outputted from the randomizing signal output device and a wobble signal read by the reading device, the recording information of the track can be restored by using the randomizing pattern.

DETAILED DESCRIPTION OF THE PREFERRED EMBODIMENTS

Referring to FIGS. 1 to 5, the following will discuss an embodiment of an information recording medium according to the present invention.

Figure 1:
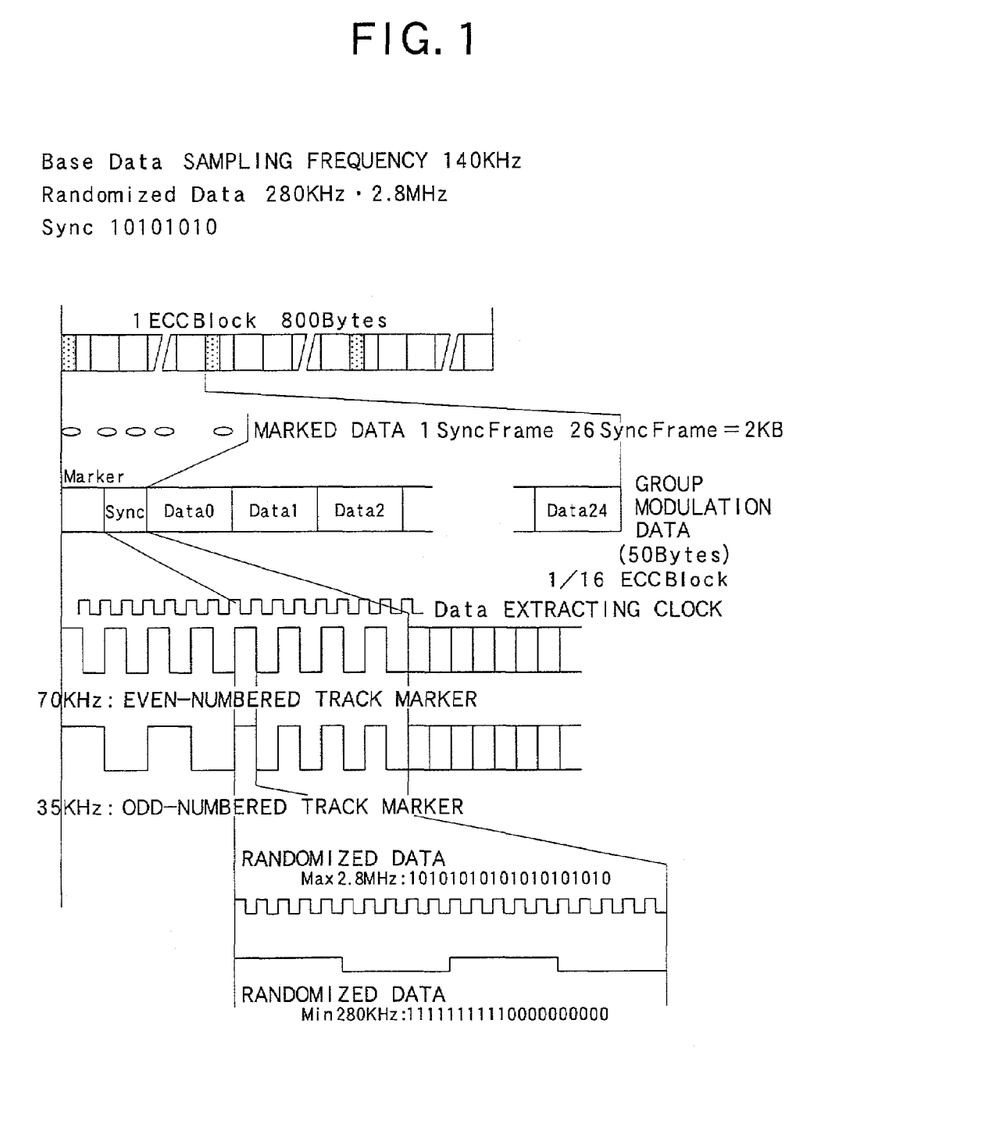
FIG. 1 is a diagram showing a signal format of an optical disk, which is an information recording medium of the present embodiment.

FIG. 1 is a diagram showing a signal format of recording information recorded as wobbling modulation on grooves in an optical disk, which is an information recording medium of the present embodiment. Hereinafter, the recording information is referred to as groove modulation data. As shown in FIG. 1, the groove modulation data of the present embodiment comprises a marker (Marker) and a synchronizing signal (Sync) that are included in a single synchronizing frame, and substantial data (Data 0 to 24) composed of 25 synchronizing frames in each ECC (error correction) block composed of 26 synchronizing frames. In the groove modulation data, the synchronizing signal and substantial data except the marker are randomized based on a predetermined random signal, and are each recorded as a wobbling signal on a groove entirely formed in a spiral fashion.

It is noted that pit (recording mark) for recording predetermined RF information (e.g., video information and voice information) is formed with a light beam on the groove.

As shown in FIG. 1, a 70-kHz track marker is located in a marker of groove modulation data corresponding to an even-numbered track. On the other hand, a 35-kHz track marker is located in a marker of groove modulation data corresponding to an odd-number track.

A 70-kHz synchronizing signal having a specific data pattern is located in the synchronizing signal. In the present embodiment, synchronizing signals (signals before randomization) are the same for all the tracks. The same data "10101010" is used for both of an even-numbered track and an odd-numbered track.

There are an address signal indicating an address of each track and error correction code in the data. It is noted that information of the data is not limited to the address signal.

Next, the following will discuss a method for randomizing with respect to a synchronizing signal and a data signal. As shown in FIG. 1, in the present embodiment, only a synchronizing signal of the groove modulation data and a data signal are randomized by spread spectrum system. Namely, by multiplying (XOR) a synchronizing signal and a data signal from DC (direct current) that have 140-kHz spectrum and a random signal having a band of 280 kHz to 2.8 MHz, a synchronizing signal and a data signal are spread from 280 kHz to 2.8 MHz. During reproduction, an original signal is recovered by multiplying the same random signal, so that a synchronizing signal and a data signal of 140 kHz can be restored from DC (direct current). In this manner, in the present embodiment, a random signal of 280 kHz to 2.8 MHz is multiplied during recovery, so that noise and crosstalk that are added to a signal before recovery is separated from a band (DC to 140 kHz) of a synchronizing signal and a data signal to the outside. Therefore, it is possible to largely reduce the influence of noise and crosstalk.

In the present embodiment, four kinds of randomized patterns (series of random functions) are used in total. A synchronizing signal and a data signal in each ECC block are each randomized by using a common randomizing pattern of four randomizing patterns. In the present embodiment, a randomizing pattern of each ECC block is selected such that adjacent tracks have different randomizing patterns as much as possible. Thus, crosstalk between adjacent tracks can be reduced more effectively. Besides, in the present specification, "adjacent tracks" indicate tracks at a position causing crosstalk that includes adjacent tracks in the same layer or tracks formed substantially in the same area of adjacent layers, regarding a recording medium with a single layer or multiple layers.

As described above, in the present embodiment, when a groove is modulated in a radius direction, spread spectrum system is used, a data signal including an error correction signal is modulated by a specific random signal, and a groove is wobbling-modulated by the signal. As a result, in the groove, a wobbled portion corresponding to the marker without being randomized and the other wobbled portion corresponding to the randomized synchronizing signal and data are alternately formed.

During reproduction, demodulation is performed by using a specific random signal from a reproduced push-pull signal so as to remove noise entering from an adjacent track and take out a data signal. In the event of an error, correction is made by an error correction signal in the ECC block so as to obtain more correct data as compared with the conventional art.

The kind of a random signal is not limited to the above, so that any kind of signal can be selected as a random signal. However, it is desirable to frequently switch a plurality of random signals such that random signals used for data in adjacent grooves are different from each other. In this case, as described above, crosstalk between adjacent tracks can be reduced more effectively.

In the present invention, only a synchronizing signal and a data signal are randomized and recorded. A track marker is recorded without randomization. Thus, a circuit is not complicated in an information recorder for recording information in an optical disk or in an information reproducing device for reproducing information recorded in an optical disk. However, all data including a track marker may be randomized and recorded.

Moreover, when a track marker is not randomized, in order to increase accuracy of reading on a marker not being randomized, it is more effective to raise a modulation factor (amplitude factor) of a groove on the part.

Figure 2:
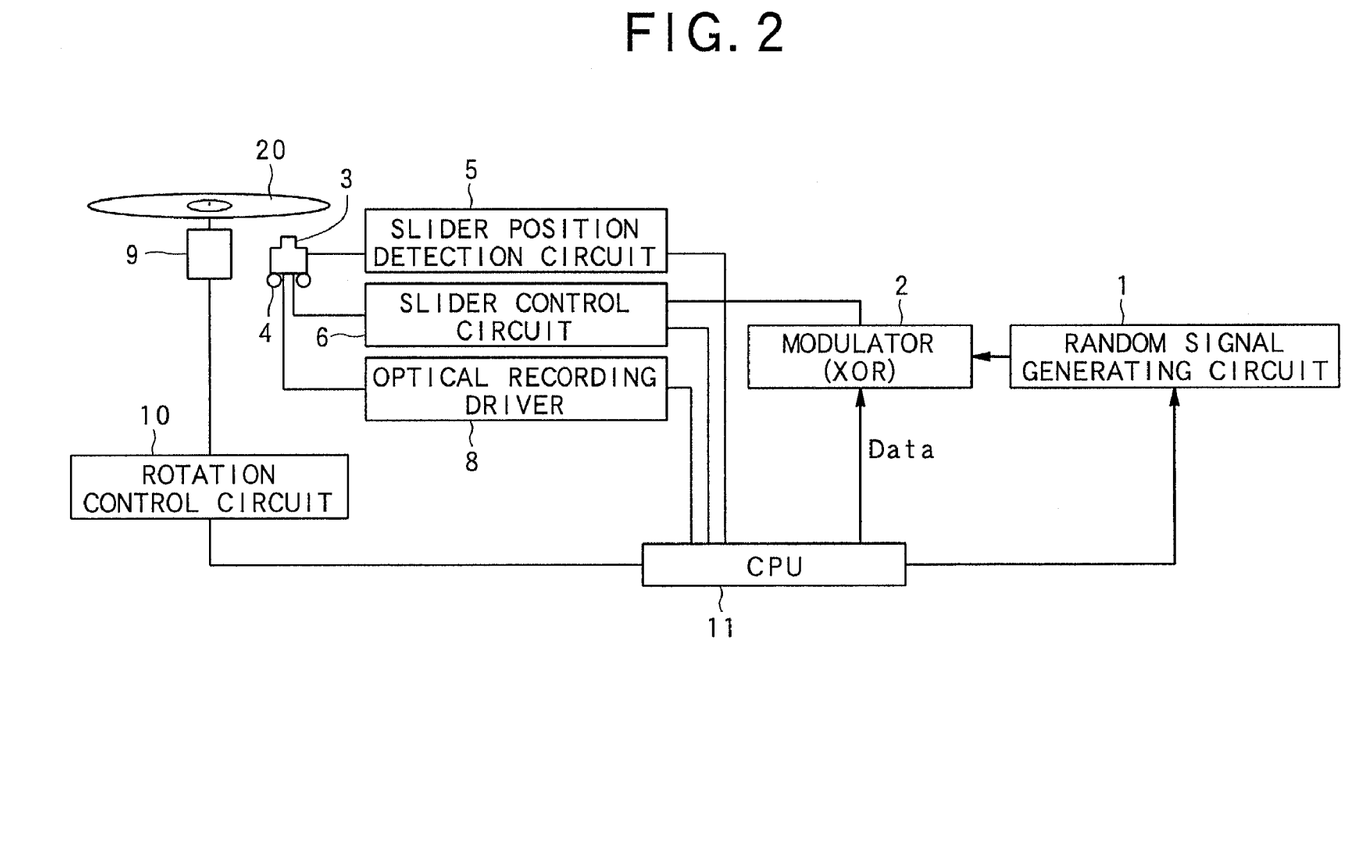
FIG. 2 is a block diagram showing the configuration of a disk cutting machine for manufacturing a master disk.

Referring to FIG. 2, the following will discuss the configuration of a disk cutting machine for manufacturing a master disk.

As shown in FIG. 2, the cutting machine is provided with: a random signal generating circuit 1 for generating a random signal; a modulator 2 for multiplying a synchronizing signal and a data signal in the groove modulation data having the above-mentioned signal format by a random signal; a recording head 3 for forming grooves on a master optical disk 20; a slider 4 for driving the recording head 3 in a radius direction of the disk; a slider position detection circuit 5 for detecting a position of the recording head 3 in a radius direction of the disk; a slider control circuit 6 for controlling a sliding position of the slider 4; an optical recording driver 8 for controlling laser light emitted from the recording head 3; a drive 9 for rotatably driving the master disk; a rotation control circuit 10 for controlling the drive 9; and a CPU 11 for controlling the random signal generating circuit 1; the modulator 2; the slider position detection circuit 5; the slider control circuit 6; the optical recording driver 8; and the rotation control circuit 10.

As shown in FIG. 2, the groove modulation data having the above-mentioned signal format are outputted to the modulator 2 via the CPU 11. It is noted that an address and so on are recorded in a memory and so on in the CPU 11 in advance as necessary. Meanwhile, the random signal generating circuit 1 generates a random signal having a band of 280 kHz to 2.8 MHz and outputs the signal to the modulator 2.

In the modulator 2, the groove modulation data outputted from the CPU 11 is multiplied by a random signal as necessary, which is outputted from the random signal generating circuit 1. As described above, in the present embodiment, only a synchronizing signal and a data signal are multiplied by a random signal before randomization.

An output signal of the modulator 2 is inputted to the slider control circuit 6, and the recording head 3 is driven by the slider 4. As a result, according to the signal format of FIG. 1, a track marker, a synchronizing signal modulated by a random signal, and a data signal modulated by a random signal are recorded in a master optical disk in the wobbling form of grooves.

Additionally, it is necessary to multiply a synchronizing signal and a data signal by a random signal at constant timing. The timing is controlled by the CPU 11.

A recordable optical disk is manufactured in large quantities by using such a master optical disk 20 according to FIG. 1.

Figure 3:
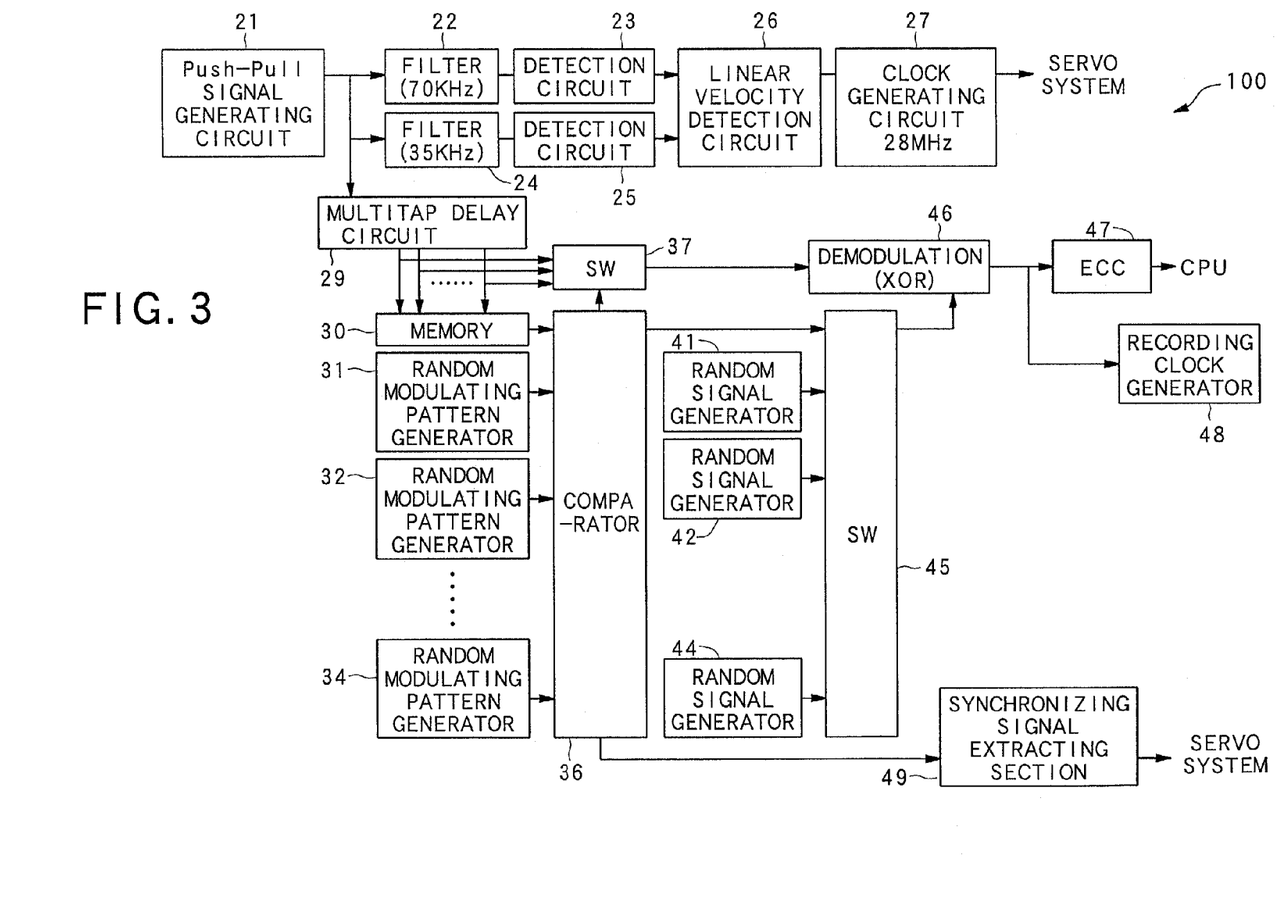
FIG. 3 is a block diagram showing the configuration of a reading apparatus.

Referring to FIG. 3, the following will discuss a reading apparatus for reading information of an optical disk that is recorded according to the signal format of FIG. 1. FIG. 3 is a block diagram showing the reading apparatus. Such a reading apparatus is provided in a recorder or a reproducing device of an optical disk.

FIG. 3 shows an example of the reading apparatus of the present invention that is applied to a reproducing device of an optical disk, on which a synchronizing signal and a data signal are modulated by using four kinds of random signal patterns as described above.

As shown in FIG. 3, a reading apparatus 100 is provided with: a push-pull signal generating circuit 21 for generating a push-pull signal from an output signal of a pair of detectors; a filter 22 for passing a 70 kHz-signal; a detection circuit 23 for detecting a 70 kHz-track marker; a filter 24 for passing a 35 kHz-signal; a detection circuit 25 for detecting a 35 kHz marker; a linear velocity detection circuit 26 for detecting a linear velocity of an optical disk in response to signals from the detection circuit 23 and the detection circuit 25; a clock generating circuit 27 for generating a clock depending upon a linear speed detected by the linear speed detection circuit 26; a multitap delay circuit 29 for receiving a signal from the push-pull signal generating circuit 21 and the clock generating circuit 27; a memory 30 for storing output signal from the multitap delay circuit 29; a first sink pattern generator 31 for generating a synchronizing signal modulated by a first random modulation pattern; a second sink pattern generator 32 for generating a synchronizing signal modulated by a second random modulation pattern; a third sink pattern generator 33 for generating a synchronizing signal modulated by a third random modulation pattern; a fourth sink pattern generator 34 for generating a synchronizing signal modulated by a fourth random modulation pattern; a comparator 36 for comparing signals stored in the memory 30 and signals of the sink pattern generators 31 to 34; a switch 37 for selecting the output of the multitap delay circuit 29; a first random signal generator 41 for generating a first random signal; a second random signal generator 42 for generating a second random signal; a third random signal generator 43 for generating a third random signal; a fourth random signal generator 44 for generating a fourth random signal; a switch 45 for selecting output signals of the first to fourth random signal generators 41 to 44; a demodulator 46 for demodulating a signal selected by the switch 37; an ECC block generator 47 for generating an ECC block in response to a demodulating signal outputted from the demodulator 46; a recording clock generator 48 for generating a recording clock in response to a demodulating signal outputted from the demodulator 46; and a synchronizing signal extracting section 49 for extracting a synchronizing signal from a signal outputted from the comparator 36.

Next, the operation of the reading apparatus 100 will be discussed. In the filer 22, a 70-kHz track marker indicating an even-numbered track is extracted from a push-pull signal outputted from the push-pull signal generating circuit 21, and the track marker is detected in the marker detection circuit 23. Meanwhile, in the filter 24, a 35-kHz track marker indicating an odd-numbered track is extracted from a push-pull signal outputted from the push-pull signal generating circuit 21, and the track marker is detected in the marker detection circuit 25.

In the linear velocity detection circuit 26, a linear velocity of track reading is computed based on track markers detected in the marker detection circuit 23 and the marker detection circuit 25.

Figure 4:
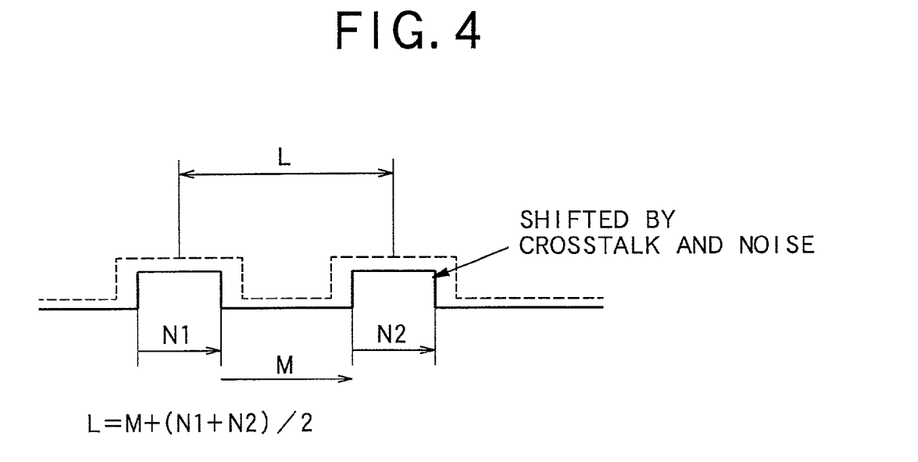
FIG. 4 is a diagram showing a method for computing a linear velocity.

FIG. 4 is a diagram showing a method for computing a linear velocity. As shown in FIG. 4, a linear velocity is computed by measuring a distance (time) between the centers of crests of track markers. When adjacent crests of track markers have widths of N1 and N2 and a trough between the crests of the track markers has a width of M, distance L between the centers of the crests of the adjacent track markers is computed by the following equation.

$$L = M + (N1 + N2)/2$$

As shown in FIG. 4, a track marker is detected with a waveform which is different from an actual waveform due to the influence of crosstalk and noise. However, since the center of the crest of a track marker is used as a reference in the present embodiment, it is possible to eliminate the influence of a detected error of a track marker when a linear velocity is computed.

In the clock generating circuit 27, a clock is generated according to a linear velocity computed in the linear velocity detection circuit 26. A clock outputted from the clock generating circuit 27 is outputted to a servo system for controlling the number of revolution of a disk. Further, the clock is inputted to the multitap delay circuit 29.

In the multitap delay circuit 29, output signals of the push-pull signal generating circuit 21 are sequentially sampled in response to clocks outputted from the clock generating circuit 27, and the signal is stored in the memory 30. Moreover, the signal is outputted to the switch 37 from the push-pull signal generating circuit 21. Signals obtained by sequentially shifting phases of push-pull signals are outputted from the multitap delay circuit 29 in response to clocks outputted from the clock generating circuit 27. In this manner, since push-pull signals are stored with shifted phases, signals can be prepared without phase differences from output signals of the first to fourth random modulation pattern generators 31 to 34, and signals can be compared in the comparator 36.

In the comparator 36, signals stored in the memory 30 and signals generated in the first to fourth random modulation pattern generators 31 to 34 are compared with each other. Among signals outputted from the first to fourth random modulation pattern generators 31 to 34, when some signals match signals of the memory 30, it is determined that a push-pull signal is modulated by the corresponding randomizing pattern. Namely, in the comparator 36, comparison is made between a waveform of a signal sampled according to a clock locked to a linear velocity and four kinds of signals outputted from the random modulation pattern generators 31 to 34 to find a matching signals. When signals conform to each other, it is determined that the waveform is a synchronizing signal after modulation and is a point having conforming phases. As described above, the ECC blocks have the same synchronizing signals.

Further, synchronizing signals of the ECC blocks are modulated by any of the first to fourth random signals. Therefore, one of synchronizing signals, which are outputted from the multitap delay circuit 29 and are stored in the memory 30 after modulation, always match a signal outputted from one of the first to fourth random modulation pattern generators 31 to 34.

Whether a signal matches or not is determined by a shift from a signal to be matched. A shift if detected, and when a shift is at a predetermined value or less, the signal is considered to be a matching signal. Regarding a data signal after a synchronizing signal as well, modulation is performed by using the same random series in the same ECC block. Thus, demodulation is performed by using the same random series until the first synchronizing signal of the subsequent ECC block. Further, in the case of sequential reproduction, a randomized pattern used for the subsequent ECC block is found in advance. Hence, a randomizing pattern thereof is prepared, and a phase of a synchronizing signal in each ECC and a phase of a randomizing pattern can be matched with each other relative to a front position of the ECC block where detection is made.

The comparator 36 switches a switch 37 so as to select a signal to be matched in the comparator 36 from push-pull signals outputted from the multitap delay circuit 29. Thus, a synchronizing signal and a data signal are outputted with suitable phases from the multitap delay circuit 29 via the switch 37. Further, the comparator 36 switches the switch 45 so as to select a random signal corresponding to a signal, which is a target of matching determination, among the first to fourth random modulation pattern generators 31 to 34. For example, when an output signal of the first random modulation pattern generator 31 matches a predetermined signal stored in the memory 30, a first random signal, which is an output signal of the first random signal generator 41, is selected.

As a result of comparison in the comparator 36, in the demodulator 46, a push-pull signal selected from output signals of the multitap delay circuit 29 is multiplied by a random signal selected from the first to fourth random signals. Hence, a synchronizing signal and a data signal are demodulated by a predetermined random signal and are outputted from the demodulator 46 as demodulating signals.

In the ECC block generator 47, an error is corrected in response to a demodulating signal outputted from the demodulator 46, and a signal after error correction is transmitted to a CPU (not shown). In the recording clock generator 48, a recording clock is generated in response to a demodulating signal outputted from the demodulator 46.

The synchronizing signal extracting section 49 extracts a synchronizing signal outputted from the comparator 36. A synchronizing signal extracted in the synchronizing signal extracting section 49 is outputted to a servo system for controlling the number of revolution of a disk, and the synchronizing signal is used for controlling a spindle servo and so on.

Figure 5:
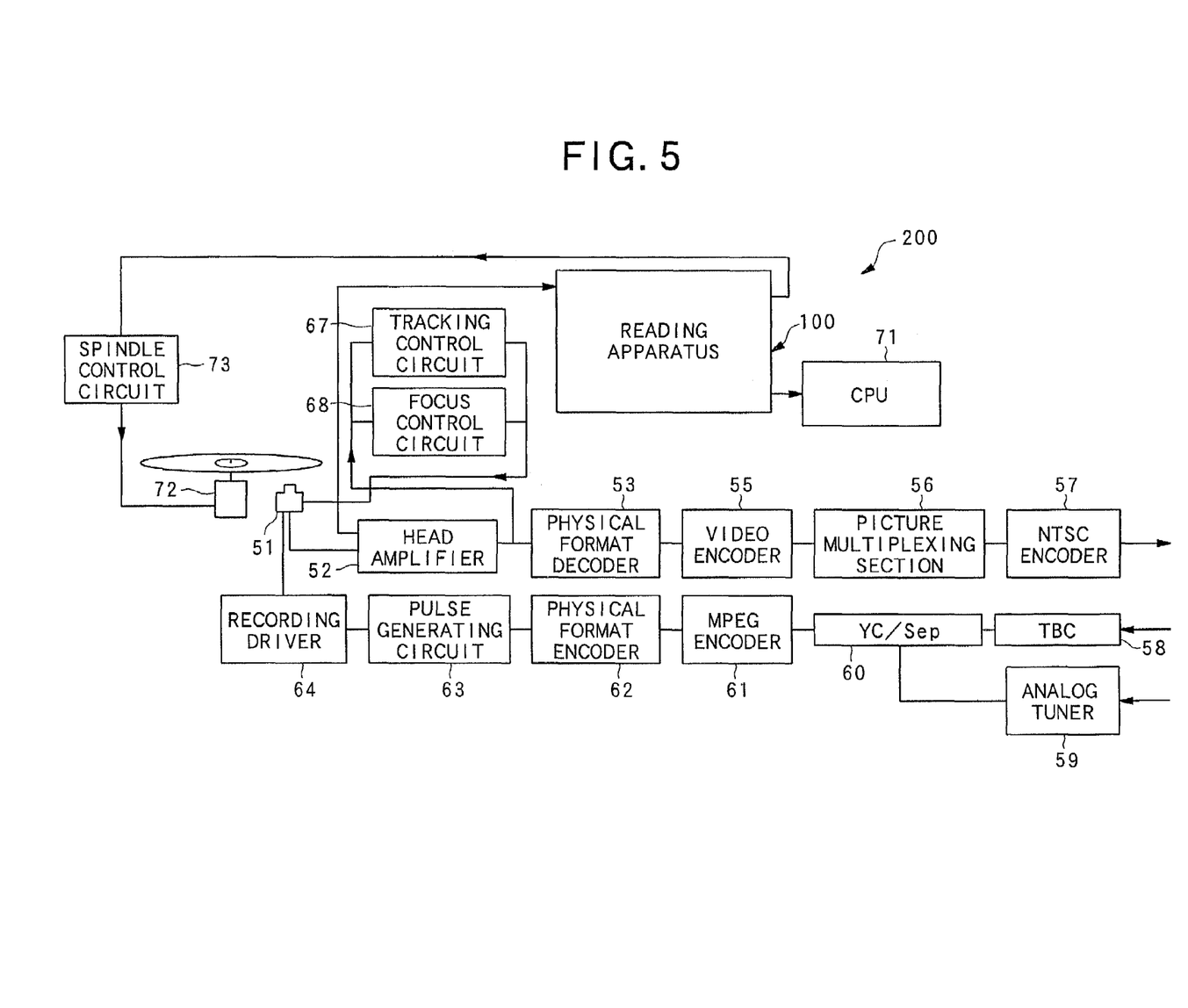
FIG. 5 is a block diagram showing the configuration of an information recording and reproducing device.

Referring to FIG. 5, the following will discuss an example in which the reading apparatus 100 of FIG. 3 is applied to an information recording and reproducing apparatus. As shown in FIG. 5, as a reproducing system, an information recording and reproducing apparatus 200 is provided with: a recording and reproducing head 51; a head amplifier 52 for receiving a reproduced signal from the recording and reproducing head; a physical format decoder 53 for receiving an output signal of the head amplifier 52; a video decoder 55 for receiving an output signal of the physical format decoder 53; a graphic user interface picture multiplexing section 56 for multiplexing a graphic user interface image in response to an output signal of the video decoder 55; and an NTSC encoder 57 for performing NTSC encoding in response to an output signal of the graphic user interface picture multiplexing section 56.

Besides, as a recording system, the information recording and reproducing apparatus 200 is provided with: a time base corrector 58 for correcting synchronization of a video signal; an analog tuner 59; a separator 60 for separating a luminance signal and a color signal in response to an output signal of the time base corrector 58 and an output signal of the analog tuner 59; an MPEG encoder 61 for performing MPEG encoding in response to an output signal of the separator 60; a physical format encoder 62 for receiving an output signal of the MPEG encoder 61; a pulse generating circuit 63 for receiving an output signal of the physical format encoder 62; and a recording driver 64 for controlling laser light emitted from the recording and reproducing head 51 in response to an output signal of the pulse generating circuit 63.

Moreover, the information recording and reproducing apparatus 200 is provided with: a tracking control circuit 67 for controlling tracking of the recording and reproducing head 51 based on an output signal of the head amplifier 52; and a focus control circuit 68 for controlling focus of the recording and reproducing head 51 based on an output signal of the recording and reproducing head 51.

As shown in FIG. 5, the information recording and reproducing apparatus 200 is provided with the reading apparatus 100 of FIG. 3. A signal obtained from the recording and reproducing head 51 via the head amplifier 52 is inputted to the push-pull signal generating circuit of the reader 100. An output signal of the ECC block generator 47 is supplied to the CPU 71 for controlling the parts of the information recording and reproducing device 200. Thus, a data signal such as address information is used for controlling the information recording and reproducing apparatus 200. The data signal is included in an output signal of the ECC block generator 47. Further, output signals of the clock generating circuit 27 and the synchronizing signal extracting section 49 are transmitted to the spindle control circuit 73. The spindle control circuit 73 controls the spindle motor 72 for rotatably driving a disk.

COMPARATIVE EXAMPLE

Next, a Comparative Example will be discussed.

Figure 6:
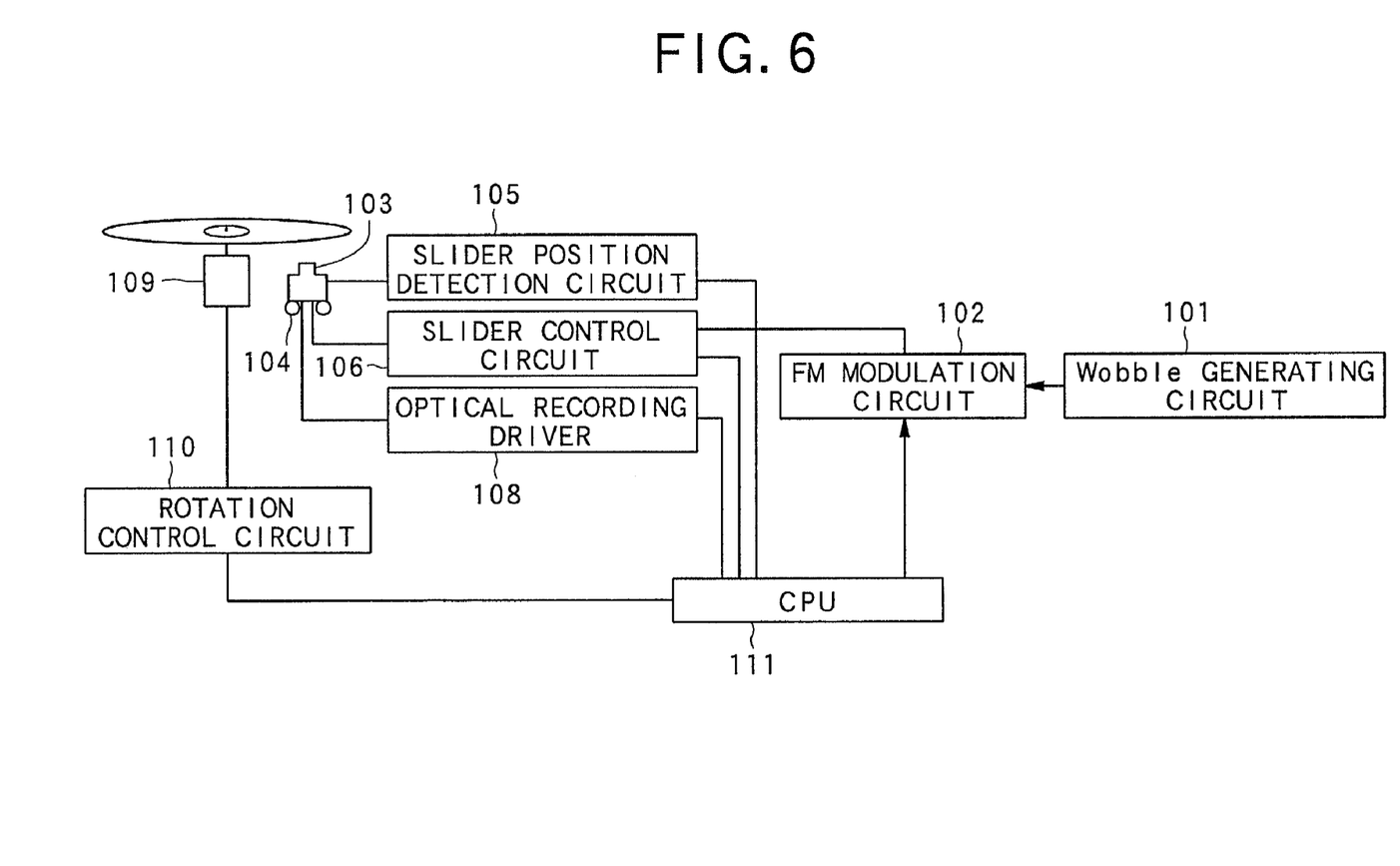
FIG. 6 is a block diagram showing a disk cutting machine for recording a wobble signal which is subjected to FM modulation.

FIG. 6 is a block diagram showing a disk cutting machine for recording a wobble signal which is subjected to FM modulation. As shown in FIG. 6, the disk cutting machine is provided with: a wobble generating circuit 101 for generating a wobble reference signal having a predetermined fundamental frequency; an FM modulating circuit 102 for performing FM modulation on the wobble reference signal; a recording head 103 for forming a groove on a master optical disk; a slider 104 for driving the recording head 103 in a radius direction of a disk; a slider position detection circuit 105 for detecting a position of the recording head 103 driven by the slider 104; a slider control circuit 106 for controlling the slider 104; an optical recording driver 108 for controlling laser light emitted from the recording head 103; a spindle motor 109 for rotatably driving a master disk; a rotation control circuit 110 for controlling the spindle motor 109; and a CPU 111 for controlling the FM modulating circuit 102, the slider position detection circuit 105, the slider control circuit 106, the optical recording driver 108, and the rotation control circuit 110.

A data signal such as address information is supplied to the FM modulating circuit 102 via the CPU 111. An unmodulated wobble reference signal outputted from the wobble generating circuit 101 is subjected to FM modulation in the FM modulating circuit 102 based on a data signal outputted from the CPU 111. A modulated signal outputted from the FM modulating circuit 102 is inputted to the slider control circuit 106. The slender 104 is driven according to a modulated signal so as to form a wobbled groove on a master disk.

Figure 7A:
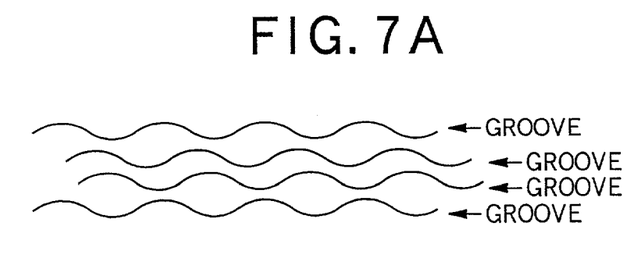
FIG. 7A is a diagram showing the shapes of the grooves of adjacent tracks.
Figure 7B:
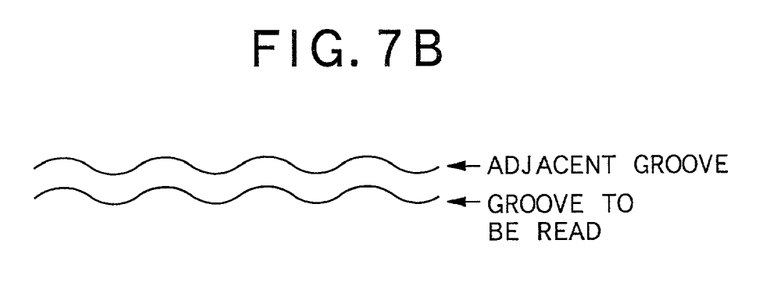
FIG. 7B is a diagram showing that adjacent tracks are in phase.
Figure 8:
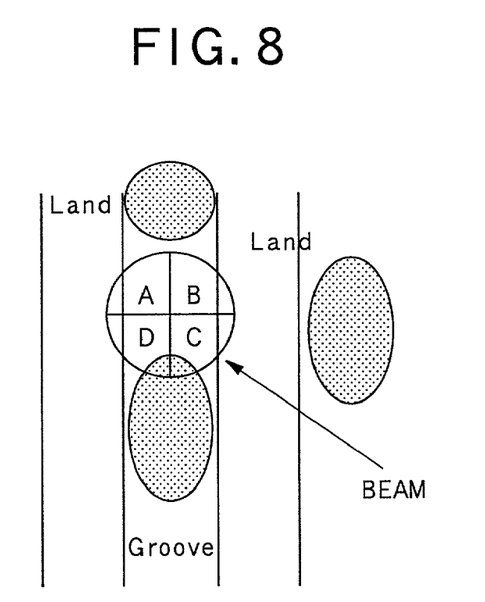
FIG. 8 is a diagram showing the positional relationship between a beam and a groove when wobble is read.

FIGS. 7A and 7B show the shapes of grooves on a plurality of adjacent tracks. FIG. 8 shows the positional relationship of a beam and a groove when a wobble is read. When a wobble signal is read, a difference between a signal corresponding to a region of A+D and a signal corresponding to a region of B+C in the beam shown in FIG. 8 is used.

In a device of the present comparative example, crosstalk caused by wobble from an adjacent track and crosstalk caused by a recording mark formed on a wobbled track enter a wobble signal. Thus, CN of a wobble signal is deteriorated, FM modulation and so on causes a problem in reading recorded data signal or results in an inaccurate wobble reference signal. Further, in a multilayer disk as well, crosstalk of a wobble signal between layers causes the same problem. Hence, it is difficult to perform accurate writing on a multilayer disk.

For example, when a track pitch is smaller, beam extends substantially to an adjacent groove and is affected by a phase of a wobble of an adjacent track. As shown in FIG. 7A, the phase relationship between adjacent grooves is changed in a complicated manner. As shown in FIG. 7B, when adjacent grooves are in phase, crosstalk, which enters a signal corresponding to the A+D region and a signal corresponding to the B+C region, is in opposite phase. Thus, a difference between a signal corresponding to the A+D region and a signal corresponding to the B+C region reaches a maximum value.

When adjacent grooves are in opposite phase, crosstalk, which enters a signal corresponding to the A+D region and a signal corresponding to the B+C region, is in phase, so that a difference is a minimum value. Hence, a difference value is considerably changed by the influence of adjacent tracks.

Moreover, FIG. 8 also shows marked pits. Because of a shape of beam, a shape of a pit, aberration of a lens, crosstalk of a pit on an adjacent groove, values corresponding to mark pits of the A+D region and the B+C region do not always conform to each other. The difference is expressed in output of wobble detection.

As described above, in the method of the Comparative Example since recording of a signal is concentrated on a specific fundamental frequency (frequency of a wobble reference signal), so that when the influence of noise and crosstalk is exerted, it is difficult to detect an accurate signal.

Besides, in the above embodiment of the present invention, randomizing patters used between adjacent tracks are made different by using four kinds of randomizing patterns. The number of randomizing patterns can be suitably determined depending upon the configuration of the recording medium such that the same randomizing pattern is not used on adjacent tracks.

In the above embodiment of the present invention, an example is shown in which a plurality of randomizing patterns is prepared and is switched for each ECC block. However, a fundamental frequency of spread spectrum is changed in a short time (e.g., several tens μsec to several hundreds μsec) without using randomizing patterns. In this case as well, data is randomized in each switching, and the same effect can be obtained as switching of a randomizing pattern in that the influence of crosstalk is reduced.

In the above embodiment of the present invention, all the ECC blocks have the same synchronizing signals, and modulation is performed on a synchronizing signal and a data signal in each ECC block by using the same randomizing pattern. However, the following configuration is also applicable: the ECC blocks use different synchronizing signals, and a synchronizing signal and a data signal in the same ECC block use different randomizing patterns. Arrangement is made such that the same randomizing patterns are not arranged between adjacent tracks. In this case, a random signal can be demodulated by allowing a synchronizing signal to correspond to a randomizing pattern used for a data signal.

According to such a configuration, a circuit used for reading a synchronizing signal and a data signal is complicated. Since a synchronizing signal and a data signal have different occupied bands, it is possible to reduce the influence of crosstalk on a synchronizing signal from a data signal. Hence, it is possible to improve accuracy of reading a synchronizing signal.

In the above embodiment of the present invention, occupied bands of randomizing patterns between adjacent tracks are not limited. The influence of crosstalk between adjacent tracks can be further reduced by separating occupied bands of randomizing patterns between adjacent tracks.

In the above embodiment of the present invention, random data is produced for a synchronizing signal and a data signal, and a track marker is recorded without randomization. However, all data may be randomized. In this case, a data extracting clock is generated by using a clock control circuit, which uses a PLL, and a revolution detector, and data can be obtained by the same method.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-134948 filed on May 2, 2001 including the specification, claims, drawings and summary is incorporated herein by reference in its entirety.

What is claimed is:

1. An information recording medium comprising a wobbled track, wherein at least a part of the track is subjected to wobbling based on a wobble signal in which at least a part of recording information is randomized,
   wherein the wobble signal includes a signal in which a fundamental frequency of spread spectrum is changed in a short time period.

2. The information recording medium according to claim 1, wherein the wobble signal has different fundamental frequencies between adjacent tracks.

3. The information recording medium according to claim 1, wherein a fundamental frequency is randomized by the same signal in a region serving as a unit of processing the recording information.

4. An information reading apparatus for reading an information recording medium having wobbled tracks, wherein
the track is wobbled based on a wobble signal including randomized information and a track marker that is not randomized, and the information reading apparatus comprises:
a reading device for reading a wobble signal based on wobbling of the track;
a detecting device for detecting a track marker signal included in the wobble signal; and
a linear velocity measuring device for measuring a linear velocity of the information recording medium based on the detected track marker signal,
wherein the randomized information is randomized by using any one of a plurality of randomizing patterns, and information reading apparatus further comprises:
a randomizing signal output device for outputting a plurality of randomizing signals by using a plurality of randomizing patterns; and
a comparing device for comparing a plurality of signals outputted from the randomizing signal output device and a wobble signal read by the reading device,
wherein the comparing device determines a randomizing pattern used for randomizing of the randomized information based on the compared result.

* * * * *